UNITED STATES PATENT OFFICE.

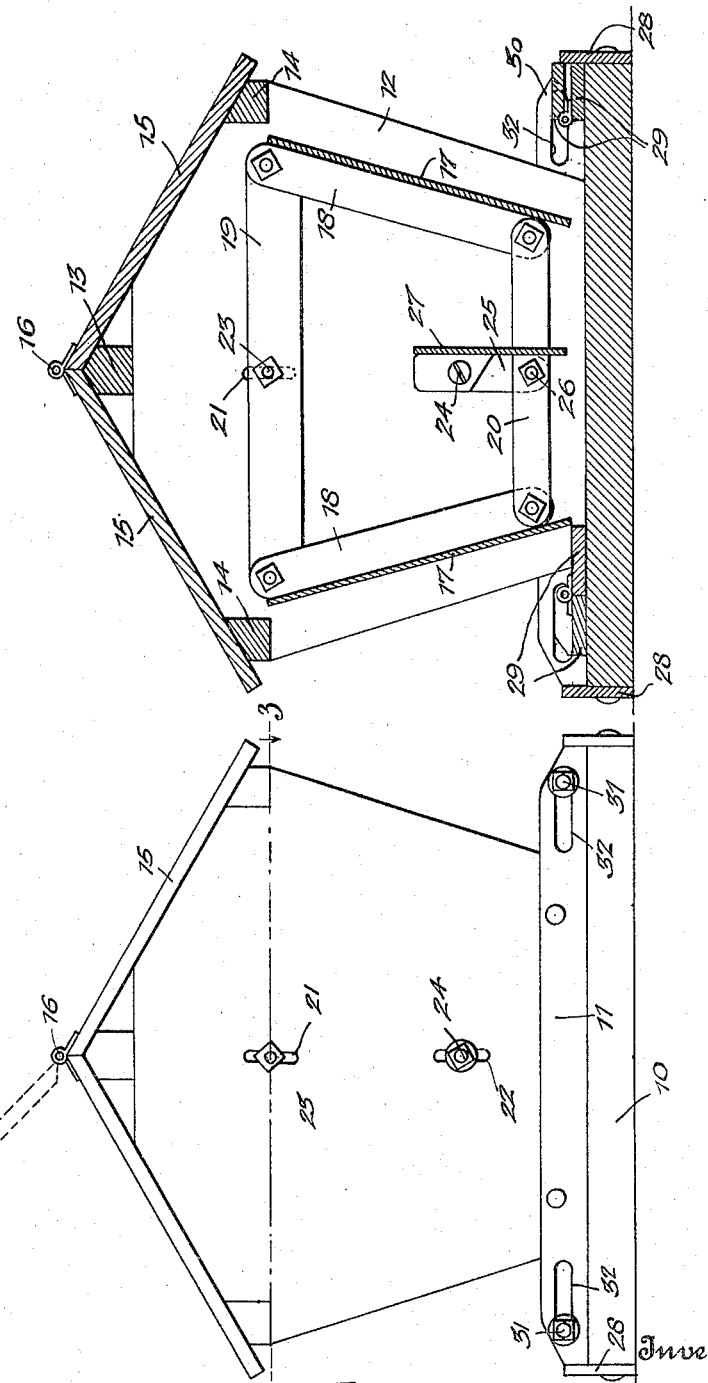

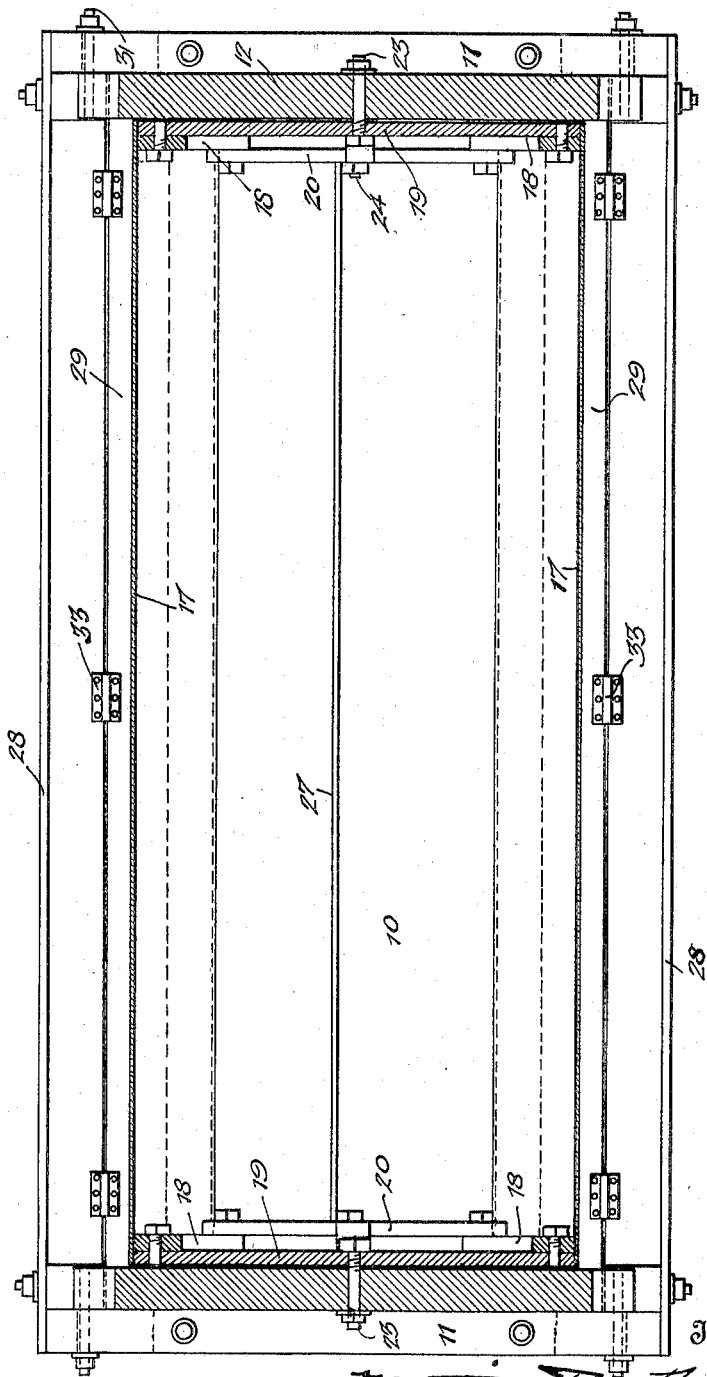

MARTIN T. ASKE, OF LANESBORO, MINNESOTA.

STOCK-FEEDER.

1,325,922.      Specification of Letters Patent.      Patented Dec. 23, 1919.

Application filed June 28, 1919. Serial No. 307,317.

*To all whom it may concern:*

Be it known that I, MARTIN T. ASKE, a citizen of the United States of America, residing at Lanesboro, in the county of Fillmore and State of Minnesota, have invented certain new and useful Improvements in Stock-Feeders, of which the following is a specification.

My present invention relates generally to stock feeders and more particularly to an improved double-trough stock feeder, my object being the provision of certain means in connection therewith to avoid the common disadvantage of clogging of the feed from the main or supply hopper.

In carrying out the invention I preferably provide a swinging hopper in protected position which is moved by the animals during feeding and which is caused to agitate the supply of feed in order to prevent clogging.

In the accompanying drawings illustrating my present invention,

Figure 1 is an end view,

Fig. 2 is a cross section, and

Fig. 3 is a horizontal section taken substantially on the line 3—3 of Fig. 1.

Referring now to these figures my invention proposes a base 10 which is substantially flat and which, at its opposite ends, is provided with cross bars 11 secured to the base and to the lower portions of upright end pieces 12, the latter of which are connected by a central longitudinal ridge piece 13. These end pieces 12 have declining edges at opposite sides of the ridge piece 13, and the lower outer portions of these upper edges of the two end pieces 12 are connected by longitudinal side beams 14 which coöperate with the ridge piece 13 and with the end pieces 12 in forming supports for the angular hinged covers 15, the hinges 16 of which extend, as shown in Figs. 1 and 2, along the ridge piece 13. The outer free edges of the covers 15 depend below and outwardly beyond the side beams 14 and are free to be lifted so that feed may be introduced from either side into the supply hopper, the latter of which is constituted by longitudinal side walls 17 extending along the space between the end pieces 12 in downwardly and inwardly inclined relation with their lower edges spaced from the upper surface of the base 10 as shown.

The side walls 17 of the hopper have at their opposite ends rigid upright pieces 18 whose upper ends, at the opposite ends of the hopper, are connected by upper links 19 and whose lower ends are similarly connected by lower links 20, the pivotal connections between which and the uprights 18 permit the side walls of the hopper to swing laterally in view of the particular mounting of the links 19 and 20 as now described.

Each of the end pieces 12 of the frame of the feeder has upper and lower vertically slotted openings 21 and 22 in which are adjustably mounted pivot studs 23 and 24 for the upper and lower cross links 19 and 20 respectively, the pivot 23 extending directly through an opening in the respective upper link 19 while the pivot 24 of each lower link extends through the upper portion of a vertically disposed arm 25 whose lower end is in turn pivotally connected at 26 to the center of the respective lower link 20 and whose function is to support a longitudinal agitating board 27 projecting longitudinally between the end pieces 12 of the frame and centrally between the lower portions of the hopper side walls 17 as particularly seen in Fig. 2.

Along its opposite sides the base 10 has side pieces 28 whose upper edges project above the upper surface of the base and inwardly beyond these side pieces or rails 28 are hinged feed boards 29, one of which has end pieces 30 provided with trunnions 31 projecting endwise from the same and through horizontally slotted openings 32 adjacent to the end portions of the cross beams 11 of the frame, thus adapting the feed boards 29 to be shifted inwardly toward and against the lower edges of the hopper walls 17 in the inoperative position as seen at the left side of Fig. 2 or outwardly against the rails 28 in the operative position as seen at the right side of Fig. 2. In the latter position the inner sections or pieces 29 are folded upwardly and outwardly, on the hinges 33, upon the outer sections or pieces in order to thus form a trough upon the upper surface of the base 10 at each side of the hopper and between the hopper and the folded feed boards 29.

It is thus obvious that with the parts in the operative position as last described animals approaching opposite sides of the stock feeder, upon reaching into the troughs formed in the manner described will upon contact with the respective side wall of the hopper, cause the latter to swing more or less on the pivotal supports previously described, bringing about coöperative action between the hopper side walls and the agitating board 27 which swings with the side walls so as to prevent clogging of the feed in the hopper and insure its even uniform distribution to the two feed troughs.

It is also obvious that by lifting either of the covers 15, feed may be readily introduced within the hopper and that the means proposed by my invention including the movable hinged feed boards 28, bringing about substantial formation of feed troughs, with the parts in operative position, are readily movable and shiftable to close such troughs and are shiftable into engagement with the sides of the hopper so as to cut off further movement thereof and feed therefrom.

I claim:—

1. A stock feeder comprising a frame including a substantially flat base having side rails and end cross beams, end uprights secured to the base and to the said cross beams and having upper outwardly declining edges at the opposite sides of their centers, a central ridge piece and side beams connecting the upper central and side portions of the said end pieces and coöperating with the upper declining edges thereof to form cover supports, a pair of covers hinged at their upper inner edges along the said ridge piece, a hopper between the end uprights having side walls provided with upright end pieces and having their lower edges spaced from the upper surface of the base, upper and lower cross links pivotally connecting the upper and lower ends of the said upright pieces of the hopper walls and pivotal connections between the said cross links and the end uprights of the frame permitting the hopper to swing laterally between the end uprights, as described.

2. A stock feeder comprising a frame including a substantially flat base having side rails and end cross beams, end uprights secured to the base and to the said cross beams and having upper outwardly declining edges at the opposite sides of their centers, a central ridge piece and side beams connecting the upper central and side portions of the said end pieces and coöperating with the upper declining edges thereof to form cover supports, a pair of covers hinged at their upper inner edges along the said ridge piece, a hopper between the end uprights having side walls provided with upright end pieces and having their lower edges spaced from the upper surface of the base, upper and lower cross links pivotally connecting the upper and lower ends of the said upright pieces of the hopper walls and pivotal connections between the said cross links and the end uprights of the frame permitting the hopper to swing laterally between the end uprights, said end cross beams of the frame having longitudinally slotted end portions, and hinged feed boards at opposite sides of the hopper and shiftable on the base, said feed boards having connecting members extending through the slots of the cross beams, as described.

3. A stock feeder including a frame comprising a substantially flat base having end uprights and provided with side portions extending beyond the opposite sides of the said uprights, a hopper mounted to swing laterally in connection with and between the said end uprights in spaced relation to the upper surface of said base, and means upon the said projecting portions of the base to form feed troughs at opposite sides of the hopper, said means being shiftable inwardly toward and in engagement with the lower side portions of the hopper, as and for the purpose described.

In testimony whereof I affix my signature.

MARTIN T. ASKE.